Patented July 18, 1950

2,515,939

UNITED STATES PATENT OFFICE 2,515,939

OPACIFIABLE PHOTOSENSITIVE GLASSES

Stanley Donald Stookey, Corning, N. Y., assignor to Corning Glass Works, Corning, N. Y., a corporation of New York No Drawing. Application December 8, 1943, Serial No. 513,445

23 Claims. (Cl. 49—92)

This invention relates to photosensitive glasses, that is, glasses in which exposure to short wave radiations such as ultraviolet brings about a change in the glass as a result of which irradiated areas are capable of heat developed coloration while non-irradiated areas remain substantially unchanged on heating. In copending applications Serial Nos. 513,441, 513,443, and 513,444, filed concurrently herewith, there are disclosed photosensitive glasses which contain silver, gold, or copper as the sensitizing constituent. It has also been shown in the Dalton Patent 2,326,012 that certain reduced copper containing glasses are photosensitive.

Such photosensitive glasses are transparent, but for some purposes it is desirable that they be opacified in order to provide a white background for the image or design to be formed in the glass by selective irradiation followed by heat treatment. Attempts to produce a spontaneously opacified photosensitive glass, that is, one which is opacified as it comes from the melting container, result in a blurring of the image or design or a loss of sharpness and detail therein, due to scattering of the effective radiations. Moreover, the image or design can be formed only in or near the surface of the glass because the activating rays can not penetrate the opacity.

In order to avoid these difficulties the attempt has been made to employ thermally opacifiable or controlled opal glasses, that is, glasses which are normally transparent but which may be opacified by reheating to a suitable temperature. However, the prior thermally opacifiable glasses cannot be made photosensitive.

The primary object of this invention is to produce an opacified photosensitive glass which contains an image or a design of maximum distinctness on a white background.

Another object is to provide a thermally opacifiable photosensitive glass.

Another object is to provide a photosensitive glass which can be opacified and in which an image or design can be formed photographically without blurring or loss of sharpness of detail.

Another object is to provide a photosensitive glass which can be opacified and in which an image or design can be formed extending to any desired depth within the glass.

I have discovered that glasses, which are free from substantial PbO and preferably contain BaO or SrO or ZnO can be made both thermally opacifiable and at the same time photosensitive by the addition of a fluoride opacifier and a small amount of a sensitizing metal. Prior thermally opacifiable glasses are lead glasses and cannot be made photosensitive. I have been unable to produce thermally opacifiable glasses containing BeO, or MgO, or CaO, or CdO in large amounts, because they either tend to opacify spontaneously or with great difficulty. Either gold or silver or copper may be used as the sensitizing metal.

My new glasses are transparent when fabricated into ware, but when reheated at 500° to 600° C. they become opaque or light-diffusing, depending upon their fluorine content. Such a glass, if irradiated with short wave radiations before reheating and while it is transparent, is affected so that when it is thereafter reheated it not only becomes opaque or light diffusing but the irradiated parts of the glass become permanently colored. If selectively irradiated, that is, if parts of the glass are shielded from the effective radiations, the shielded parts will become only opacified, but not colored. By this means ornamental designs and images can be reproduced in the glass by conventional photographic printing methods and such images and designs will appear with a high degree of sharpness and detail against the opacified background. If irradiation is continued for a time sufficient to permit the latent effect of the radiations to extend completely through the glass, the image or design which results on reheating the glass will also extend completely through the glass.

As examples illustrating glass compositions which are suitable for use according to my invention, the following batches, in parts by weight, are given:

|  | 1 | 2 | 3 | 4 | 5 | 6 | 7 | 8 | 9 | 10 | 11 |
|---|---|---|---|---|---|---|---|---|---|---|---|
| $SiO_2$ | 100 | 100 | 100 | 100 | 100 | 100 | 100 | 100 | 100 | 100 | 100 |
| $Na_2CO_3$ | 22 | 22 | 22 | 22 | 22 | 38 | 22 | 22 | 33 | 46 | 46 |
| $K_2CO_3$ (85%) | 10 | 10 | 10 | 10 | 10 |  | 10 | 10 |  |  |  |
| $Al(OH)_3$ | 15 | 15 | 15 | 15 | 15 | 4 | 15 | 15 | 4 |  |  |
| $BaCO_3$ | 16 | 16 | 16 | 16 | 16 |  | 16 |  |  |  |  |
| ZnO |  |  |  |  |  | 12 |  | 12 |  |  |  |
| $SrCO_3$ |  |  |  |  |  |  |  |  | 19 |  |  |
| $Na_2SiF_6$ | 5 | 5 | 5 | 5 | 5 | 5 | 5 | 5 | 10 |  |  |
| $Na_3AlF_6$ |  |  |  |  |  |  |  |  |  | 14 | 14 |
| $NaNO_3$ |  |  |  | 4 |  | 2 |  |  | 2 | 4 | 4 |
| Sugar | 1 |  |  |  |  |  |  |  |  |  |  |
| $NH_4Cl$ |  | 1.8 |  |  |  |  |  |  |  |  |  |
| NaCl | 1.8 |  | 1.8 | 1.8 | 1.8 | 1.8 | 1.8 | 1.8 |  | 1 | 1 |
| $CeO_2$ |  | .05 |  |  | .05 | .05 |  |  | .07 |  | .04 |
| $SnO_2$ | .35 | .35 |  |  |  |  | .03 |  |  |  |  |
| CuO | .15 | .15 |  |  |  |  |  |  |  |  |  |
| Au |  |  | .02 | .014 | .014 | .02 | .013 |  | .02 | .014 | .014 |
| AgCl |  |  |  |  |  |  |  | .13 |  |  |  |

Glasses 1—9 represent the preferred embodiment of my invention and contain either BaO, ZnO or SrO. Each glass is free from PbO. Each batch contains sodium silico fluoride as the opacifying agent, and a compound of gold, silver or copper as the sensitizing agent. The batches which contain copper contain also a reducing agent which may be a carbonaceous material or ammonium chloride. The latter acts as a mild reducing agent in copper-containing photosensitive glasses and is useful because it permits a very accurate reduction of such glasses to the optimum photosensitivity. The chloride seems also to assist in the opacification of the glass and for this reason sodium chloride is added to those batches which contain no ammonium chloride. The batches which contain gold or silver are free from reducing agents. The amounts of opacifying and reducing agents will vary with the size and type of melt. The above batches are suitable for melting in crucibles of one pound capacity. For large pot melts somewhat less of these agents is required.

The successful practice of my invention is influenced by the following considerations. The gold containing glasses in general possess a higher degree of photosensitivity and can develop a wider range of colors than either the silver- or the copper-containing glasses. Photosensitivity is generally inhibited by the presence in the glass of ultra-violet absorbing materials, such as compounds of arsenic, antimony, uranium, thallium, iron, vanadium, manganese, selenium, etc. Lead should not be present, in amounts greater than 2% to 3% of PbO, because it then inhibits photosensitivity. $B_2O_3$ in excess of 4% to 5% and $Al_2O_3$ in excess of 5% to 6% should be avoided because they then decrease the photosensitivity. The presence of copper is fatal to the photosensitivity of the gold-containing glasses and also the silver-containing glasses. In the gold-containing glasses about 0.01% to 0.03% of gold is required for good results and it is introduced into the glass by dissolving it in aqua regia and adding the solution to the batch. Likewise, in the silver-containing glasses only a small percentage of silver is required, about 0.05% to 0.3% computed as AgCl. Somewhat larger amounts of copper may be employed, say from about 0.1% to 1% computed as $Cu_2O$.

The presence of substantial tin oxide decreases the photosensitivity of the gold-containing glasses by causing heat developed coloration irrespective of irradiation. In amounts greater than about 0.02% $SnO_2$, it is practically inhibitive. However, 0.02% or less of $SnO_2$ may be advantageous for some purposes because it will induce coloration in the unexposed parts of the glass when reheated, the color of the irradiated parts being earlier developed and different in hue than the color of the unexposed parts. Thus a two-tone design or an image with a background of contrasting color can be produced in a single treatment.

The presence of tin oxide in substantial amount in the copper-containing glasses is desirable for the development of a red color on heating as shown in the above mentioned Dalton patent.

The presence of a very small amount of cerium in either gold- or silver- or copper-containing glasses greatly improves their photosensitivity. In the gold-containing glasses it increases the exposure speed about ten-fold, i. e., decreases the time of exposure by a factor of ten. Amounts as small as about 0.05% $CeO_2$ are sufficient for producing such effects. Larger amounts cause absorption of the effective radiations and inhibit or prevent photosensitivity. Photosensitive glasses containing (1) copper and cerium, and (2) silver and cerium, and (3) gold and cerium are described and claimed in three other applications Serial Nos. 513,444, 513,441, and 513,443 respectively filed concurrently herewith.

The addition of oxidizing agents such as nitre ($NaNO_3$), salt-peter ($KNO_3$), or other material having an oxidizing action to gold-containing glasses does not greatly affect the rate of photosensitive reaction, but intensifies the colors produced by irradiation and reheating. However, the presence of reducing agents in the batches of the gold- or the silver-containing glasses causes loss of photosensitivity in the glass. On the other hand, the copper-containing glasses must be reduced and their batches should be free from strong oxidizing agents.

The time of exposure necessary to obtain an effect in my glasses which can be developed into a coloration by heating will vary, depending upon the composition of the glass, the color effects desired and the intensity of the effective radiations, that is, the source and distance of the radiations from the glass during exposure. The time and intensity necessary for a desired effect can readily be determined by trial A five minute direct exposure at a distance of eight inches from a carbon arc usually suffices to produce a blue color in a glass containing gold and cerium when subsequently heated for about thirty minutes at 550° C. Somewhat longer exposures are required for the above copper-containing glasses.

Although ultraviolet emitting lamps, such as the carbon arc or the quartz mercury arc, are convenient sources of short wave radiations effective for my purpose, it is my intention to include all X-rays, radioactive radiations, etc., within the scope of the invention.

The temperature or time of heat treatment of my glasses necessary for the development of coloration in the irradiated parts will depend upon how greatly the gold, or silver, or copper in the glass has been affected by irradiation. The most suitable temperatures are between 500° and 600° C. Long treatments at the lower temperatures are as effective as short treatments at the higher temperatures. Too drastic heat treatments may cause the development of some coloration in the unexposed areas. Thirty minutes at 550° C. is a suitable average heat treatment.

The color produced in the glasses depends upon the sensitizing metal which is present and in the case of gold it depends also upon the time and intensity of exposure and the duration and temperature of heating. Copper glasses develop various shades of red. The color of the gold-containing glasses may vary from blue through lavender, purple and maroon to red, changing in that order as the effective exposure is increased or as the time and temperature of heating are increased. The silver-containing glasses develop either a bright yellow or an amber color. In general the silver-containing glasses resemble the gold glasses in their reaction to $CeO_2$, $SnO_2$, and oxidizing agents. Both gold and silver may be present in the same glass and the remaining colors will be various shades of red and amber.

As a result of the unusual photosensitivity of my new glasses, photographic negatives can be employed in the conventional manner using an ultraviolet light source to make heat developed images in the glass against an opacified background, the images being equal in detail and contrast to chemically reduced images printed in like manner upon photographic printing paper. The glass plates and cellulose films, which are commonly used as supports for the emulsion of photographic negatives, have a substantial absorption for ultraviolet. Although such absorption is not sufficient to prevent printing of my glasses with ultraviolet in the usual manner, I have found that it practically quadruples the exposure time necessary to produce a given effect in a given glass with a given light source. This difficulty can be mitigated by using negatives in which the emulsion is supported on plates of ultraviolet transmitting glass or by forming the emulsion directly upon the glass in which the positive image is to be developed.

It is to be understood that the photosensitivity discovered by me in the glasses of my invention differs from, and the term as used herein excludes, the so-called solarization effect which has long been recognized as common to glasses containing manganese or iron. The dissolution of glass by solarization appears during irradiation, but is not permanent and may be destroyed by heating the glass. On the contrary, the coloration of my photosensitive glasses does not appear during irradiation but is developed only by heating the irradiated glass at temperatures below its softening point. This heat-developed coloration cannot be destroyed by such heating.

The term "fluorine containing silicate glass," as used in the claims, means a glass prepared by fusion of raw glass making materials, containing on the oxide a major proportion of silica, a minor proportion of alkali metal oxide such as sodium oxide or potassium oxide or mixtures thereof, a minor proportion of fluorine, preferably containing a minor amount of an oxide selected from the group consisting of barium oxide, strontium oxide and zinc oxide, and optionally containing a minor proportion of another conventional glass forming oxide such as $Al_2O_3$, $B_2O_3$, or PbO, but being free of materials which inhibit photosensitivity, including compounds of arsenic, antimony, uranium, thallium, iron, vanadium, manganese and selenium, and being substantially free of compounds of beryllium, magnesium, calcium and cadmium and also over 6% $Al_2O_3$, or over 5% $B_2O_3$ and over 3% PbO.

I claim:

1. A transparent photosensitive glass consisting essentially of a thermally opacifiable, fluorine-containing silicate glass containing, on the oxide basis by weight, the indicated proportion of a photosensitive metal selected from the group consisting of 0.01% to 0.03% of gold computed as Au, 0.05% to 0.3% of silver computed as AgCl, and 0.1% to 1% of copper computed as $Cu_2O$, and $CeO_2$ in an amount up to 0.05%.

2. A transparent photosensitive glass consisting essentially of a thermally opacifiable, fluorine-containing, oxidized silicate glass containing, on the oxide basis by weight, 0.01% to 0.03% of gold computed as Au, and $CeO_2$ in an amount up to 0.05%.

3. A transparent photosensitive glass consisting essentially of a thermally opacifiable, fluorine-containing, oxidized silicate glass containing, on the oxide basis by weight, 0.05% to 0.3% of silver computed as AgCl, and $CeO_2$ in an amount up to 0.05%.

4. A transparent photosensitive glass consisting essentially of a thermally opacifiable, fluorine-containing, reduced silicate glass containing, on the oxide basis by weight, 0.1% to 1% of copper computed as $Cu_2O$, and $CeO_2$ in an amount to 0.05%.

5. A transparent photosensitive glass consisting essentially of a thermally opacifiable, fluorine-containing silicate glass containing, on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, and $SnO_2$ in an amount up to 0.02%.

6. A transparent photosensitive glass consisting essentially of a thermally opacifiable, fluorine-containing silicate glass containing, on the oxide basis by weight, the indicated proportion of a photosenstive metal selected from the group consisting of 0.01% to 0.03% of gold computed as Au, 0.05% to 0.3% of silver computed as AgCl and 0.1% to 1% of copper computed as $Cu_2O$, $CeO_2$ in an amount up to 0.05%, and $SnO_2$ in an amount up to 0.02%.

7. An article comprising a body of irradiated, substantially colorless photosensitive glass consisting essentially of a fluorine-containing, thermally opacifiable, silicate glass containing, on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, said glass body containing within its mass a predetermined latent photographic image capable of being developed, by uniform heating of the entire glass body, into a visible, colored image exhibiting photographic detail.

8. An article comprising a body of irradiated, substantially colorless photosensitive glass consisting essentially of a fluorine-containing, thermally opacifiable, silicate glass containing, on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, and $CeO_2$ in an amount up to 0.05%, said glass body containing within its mass a predetermined latent photographic image capable of being developed, by uniform heating of the entire glass body, into a visible, colored image exhibiting photographic detail.

9. An article comprising a body of irradiated, substantially colorless photosensitive glass consisting essentially of a thermally opacifiable, fluorine-containing silicate glass containing, on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, and $SnO_2$ in an amount up to 0.02%, said glass body containing within its mass a predetermined latent photographic image capable of being developed, by uniform heating of the entire glass body, into a visible, colored image exhibiting photographic detail.

10. An article comprising a body made of an opaque glass consisting essentially of a thermally opacified, fluorine-containing silicate glass containing, on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, selected portions of said glass body being colored by the photosensitive metal to form within its mass a heat-stable image exhibiting photographic detail against a white opaque background.

11. An article comprising a body made of an opaque glass consisting essentially of a thermally opacified, fluorine-containing silicate glass containing, on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, and $CeO_2$ in an amount up to 0.05%, selected portions of said glass body being colored by the photosensitive metal to form within its mass a heat-stable image exhibiting photographic detail against a white opaque background.

12. An article comprising a body made of an opaque glass consisting essentially of a thermally opacified, fluorine-containing, oxidized silicate glass containing, on the oxide basis by weight, 0.01% to 0.03% of gold computed as Au, and $CeO_2$ in an amount up to 0.05%, selected portions of said glass body being colored by the gold to form within its mass a heat-stable image exhibiting photographic detail against a white opaque background.

13. An article comprising a body made of an opaque glass consisting essentially of a thermally opacified, fluorine-containing, oxidized silicate glass containing, on the oxide basis by weight, 0.05% to 0.3% of silver computed as AgCl, and $CeO_2$ in an amount up to 0.05%, selected portions of said glass body being colored by the silver to form within its mass a heat-stable image exhibiting photographic detail against a white opaque background.

14. An article comprising a body made of an opaque glass consisting essentially of a thermally opacified, fluorine-containing, reduced silicate glass containing, on the oxide basis by weight, 0.1% to 1% of copper computed as $Cu_2O$, and $Ce_2O$ in an amount up to 0.05%, selected portions of said glass body being colored by the copper to form within its mass a heat-stable image exhibiting photographic detail against a white opaque background.

15. An article comprising a body made of an opaque glass consisting essentially of a thermally opacified, fluorine-containing silicate glass containing on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, and $SnO_2$ in an amount up to 0.02%, selected portions of said glass body being colored by the photosensitive metal to form within its mass a heat-stable image exhibiting photographic detail against a white opaque background.

16. An article comprising a body made of an opaque glass consisting essentially of a thermally opacified, fluorine-containing silicate glass containing, on the oxide basis by weight, the indicated proportion of a photosensitive metal selected from the group consisting of 0.01% to 0.03% of gold computed as Au, 0.05% to 0.3% of silver computed as AgCl and 0.1% to 1% of copper computed as $Cu_2O$, $CeO_2$ in an amount up to 0.05%, and $SnO_2$ in an amount up to 0.02%, selected portions of said glass body being colored by the photosensitive metal to form within its mass a heat-stable image exhibiting photographic detail against a white opaque background.

17. A transparent photosensitive glass consisting essentially of a thermally opacifiable, fluorine-containing silicate glass containing, on the oxide basis by weight, the indicated proportion of a photosensitive metal selected from the group consisting of 0.01% to 0.03% of gold computed as Au, 0.05% to 0.3% of silver computed as AgCl, and 0.1% to 1% of copper computed as $Cu_2O$.

18. A transparent photosensitive glass consisting essentially of a thermally opacifiable, fluorine-containing, oxidized silicate glass containing, on the oxide basis by weight, 0.01% to 0.03% of gold computed as Au.

19. A transparent photosensitive glass consisting essentially of a thermally opacifiable, fluorine-containing, oxidized silicate glass containing, on the oxide basis by weight, 0.05% to 0.3% of silver computed as AgCl.

20. A transparent photosensitive glass consisting essentially of a thermally opacifiable, fluorine-containing, reduced silicate glass containing, on the oxide basis by weight, 0.1% to 1% of copper computed as $Cu_2O$.

21. An article comprising a body made of an opaque glass consisting essentially of a thermally opacified, fluorine-containing, oxidized silicate glass containing, on the oxide basis by weight, 0.01% to 0.03% of gold computed as Au, selected portions of said glass body being colored by the gold to form within its mass a heat-stable image exhibiting photographic detail against a white opaque background.

22. An article comprising a body made of an opaque glass consisting essentially of a thermally opacified, fluorine-containing, oxidized silicate glass containing, on the oxide basis by weight, 0.05% to 0.3% of silver computed as AgCl, selected portions of said glass body being colored by the silver to form within its mass a heat-stable image exhibiting photographic detail against a white opaque background.

23. An article comprising a body made of an opaque glass consisting essentially of a thermally opacified, fluorine-containing, reduced silicate glass containing, on the oxide basis by weight, 0.1% to 1% of copper computed as $Cu_2O$, selected portions of said glass body being colored by the copper to form within its mass a heat-stable image exhibiting photographic detail against a white opaque background.

STANLEY DONALD STOOKEY.

REFERENCES CITED

The following references are of record in the file of this patent:

UNITED STATES PATENTS

| Number | Name | Date |
|---|---|---|
| 332,294 | Shirley | Dec. 15, 1885 |
| 337,170 | Libbey | Mar. 2, 1886 |
| 343,823 | Libbey | June 15, 1886 |
| 366,364 | Atterbury | July 12, 1887 |
| 653,252 | Lawton et al. | July 10, 1900 |
| 1,169,571 | Rosenthal | Jan. 25, 1916 |
| 1,192,048 | Elliott | July 25, 1916 |
| 1,403,752 | Enequist | Jan. 17, 1922 |
| 1,475,573 | Drescher | Nov. 27, 1923 |
| 1,572,625 | Taylor | Feb. 9, 1926 |
| 1,899,230 | Crowell | Feb. 28, 1933 |
| 2,049,765 | Fischer | Aug. 4, 1936 |
| 2,237,042 | Truby | Apr. 1, 1941 |
| 2,314,804 | Wilson | Mar. 23, 1943 |
| 2,326,012 | Dalton | Aug. 3, 1943 |
| 2,339,928 | Hood | Jan. 25, 1944 |
| 2,422,472 | Dalton | June 17, 1947 |

FOREIGN PATENTS

| Number | Country | Date |
|---|---|---|
| 4,821 | Great Britain | 1887 |
| 94,642 | Switzerland | 1922 |
| 562,920 | France | 1923 |

OTHER REFERENCES

Glass Industry, June 1936, pages 205 to 209.
Ceramic Industry (September 1940), page 52.
Gregory, Uses and Applications of Chemicals and Related Materials, vol. II, page 19.

Certificate of Correction

Patent No. 2,515,939                                               July 18, 1950

STANLEY DONALD STOOKEY

It is hereby certified that error appears in the printed specification of the above numbered patent requiring correction as follows:

Column 5, line 31, for the word "remaining" read *resulting*; line 60, for "dissolution" read *discoloration*; line 72, after "oxide" insert *basis*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*